United States Patent [19]

Doi et al.

[11] Patent Number: 5,344,874

[45] Date of Patent: * Sep. 6, 1994

[54] PROCESS FOR PRODUCING A CONDENSED RESIN DISPERSION

[75] Inventors: Takao Doi, Yokohama; Noriko Itaya, Tokyo; Masami Yamashita; Nobuaki Kunii, both of Yokohama, all of Japan

[73] Assignee: Asahi Glass Company Ltd., Tokyo, Japan

[*] Notice: The portion of the term of this patent subsequent to Jul. 9, 2008 has been disclaimed.

[21] Appl. No.: 726,763

[22] Filed: Jul. 8, 1991

Related U.S. Application Data

[63] Continuation of Ser. No. 413,584, Sep. 28, 1989, Pat. No. 5,030,685.

[30] Foreign Application Priority Data

Sep. 28, 1988 [JP] Japan .................. 63-240740
Sep. 28, 1988 [JP] Japan .................. 63-240741

[51] Int. Cl.$^5$ ................................. C08J 3/07
[52] U.S. Cl. ........................ 524/593; 524/594; 524/596; 524/597; 524/611; 524/612; 524/721; 524/755; 524/757; 525/398; 525/472; 528/44; 528/61; 528/176; 528/230; 528/232; 528/254; 528/256
[58] Field of Search ........... 524/593, 594, 596, 597, 524/611, 612, 721, 755, 757; 525/398, 472; 528/44, 61, 176, 230, 232, 254, 256

[56] References Cited

U.S. PATENT DOCUMENTS

| | | | |
|---|---|---|---|
| 4,122,049 | 10/1978 | Wagner | 521/136 |
| 4,130,697 | 12/1978 | Stern et al. | 521/106 |
| 4,206,109 | 6/1980 | Reischel et al. | 524/591 |
| 4,225,481 | 9/1980 | Wagner | 524/765 |
| 4,246,160 | 1/1981 | Wagner et al. | 524/387 |
| 4,260,530 | 4/1981 | Reischel et al. | 524/596 |
| 4,282,135 | 8/1981 | Wagner | 524/377 |
| 4,301,262 | 11/1981 | Wagner et al. | 525/509 |
| 4,454,254 | 6/1984 | Reichel et al. | . |
| 4,482,651 | 11/1984 | Reischel et al. | 521/115 |

FOREIGN PATENT DOCUMENTS 2639254 3/1978 Fed. Rep. of Germany .
2228804 12/1974 France .
2306226 10/1976 France .
2133412 7/1984 United Kingdom .

OTHER PUBLICATIONS

Chemical Abstracts, vol. 89, No. 16, Oct. 16, 1978, p. 32, abstract No. 130358w, Columbus, OH, US; JP-A-53 54 298 Mitsubishi Gas Chemical Co., Inc.) May 17, 1978.

*Primary Examiner*—Samuel A. Acquah
*Attorney, Agent, or Firm*—Oblon, Spivak, McClelland, Maier & Neustadt

[57] ABSTRACT

A process for producing a condensed resin dispersion, which comprises subjecting an aldehyde and a compound condensable with the aldehyde, or their precondensate, to a condensation reaction in a dispersion medium consisting essentially of water and/or an organic solvent, to precipitate fine condensed resin particles which hardly settle in said dispersion medium, and then replacing the water and/or the organic solvent by an active hydrogen-containing compound having at least two active hydrogen-containing groups reactive with isocyanate groups.

13 Claims, No Drawings

PROCESS FOR PRODUCING A CONDENSED RESIN DISPERSION

This application is a continuation application of parent application Ser. No. 07/413,584, filed Sep. 28, 1989, now U.S. Pat. No. 5,030,685 issued Jul. 9, 1991.

The present invention relates to a process for producing a condensed resin dispersion suitable for use for the production of polyurethane.

As a polyol useful as the staring material for polyurethane, so-called polymer polyol or graft polyol has been known. This is a polymer polyol having an addition polymerization type polymer grafted to the molecular chain of a polyol such as polyether polyol or unsaturated polyol, or a polymer polyol having an addition polymer or other polymer simply dispersed in a polyol. As a method for producing a polymer polyol of this type, it is known to polymerize a vinyl monomer such as acrylonitrile or styrene in a liquid polyol, to simply disperse a preliminarily prepared polymer such as a vinyl polymer in a polyol, or to graft such a dispersed polymer to a polyol. In most cases, the polymers in such conventional polymer polyols are vinyl polymers. Exceptionally, however, a polymer polyol having a linear polyester dispersed therein, is also known.

Further, it is known to use an amino resin precondensate as a starting material for polyurethane. The amino resin precondensate has hydroxyl groups reactive with isocyanate groups, such as methylol groups. Therefore, by reacting such an amino resin precondensate with a polyisocyanate compound, a polyurethane foam is obtainable (U.S. Pat. No. 4,130,697). It is also known to use a mixture comprising an etherified amino resin precondensate having a part of methylol groups of the amino resin precondensate etherified and a usual polyol useful as the starting material of polyurethane, as a starting material for the production of polyurethane foam (Japanese Unexamined Patent Publication No. 153000/1977). A method for producing such an amino resin precondensate by condensation in a polyol, has also already been proposed (Japanese Unexamined Patent Publication No. 101848/1979).

The above-mentioned conventional materials for polyurethane have various problems. Firstly, the so-called polymer polyol is suitable, for example, as a starting material for highly elastic polyurethane foam, but it has an unsolved problem that it is not only ineffective for flame retardancy of polyurethane, but tends to deteriorate the flame retardancy.

On the other hand, a polyol containing an amino resin precondensate is hardly capable of providing high elastic effects to a polyurethane foam characteristic of the polymer polyol, since the amino resin precondensate is a polyol having a relatively low molecular weight and does not have a high molecular weight like the polymer in the above-mentioned polymer polyol. Accordingly, its application is limited for a hard polyurethane foam. Therefore, this polyol is hardly regarded as a kind of polymer polyols.

Whereas, it is also known to impart flame retardancy to polyurethane by incorporating a cross-linked high molecular weight condensed resin powder to polyurethane as a filler. However, it is difficult to uniformly disperse such a filler in a polyol. Namely, it is inferior in the disperseion stability as compared with a so-called polymer polyol, and such is disadvantageous from the viewpoint of the production of polyurethane.

Further, U.S. Pat. Nos. 4,225,481, 4,282,135, 4,246,160 and 4,301,262 propose a method for producing a dispersion of an aminoplast condensate by condensing a substance capable of forming an aminoplast in a polyhydroxy compound. However, even by this method, a completely stable dispersion resin particles are hardly obtainable, and the resin particles thereby obtained are fine particles only.

U.S. Pat. No. 4,122,049 discloses a method of forming sedimentary particles and incorporating them to a polyol, etc. However, in this case, the particle size is large, whereby the particles are likely to settle in the polyol. To improve the dispersion stability of such condensed type resin particles, it is necessary to reduce the particle size. On the other hand, if the particle size is reduced, the particles tend to hardly settle, and there has been a problem that the separation by filtration tends to be difficult.

It is an object of the present invention to solve the above-mentioned various problems inherent to the conventional polymer-containing polyols as starting materials for polyurethane and to provide a novel process for preparing a condensed resin dispersion having excellent dispersion stability and low viscosity, which is useful as a starting material for producing flame retardant polyurethane.

The present inventors have conducted various studies for a condensed resin dispersion having excellent dispersion stability and low viscosity. As a result, they have found it possible to obtain a polyurethane foam having excellent flame retardancy by using as a polyurethane starting material a dispersion which is prepared by using a condensed resin of adequately cross-linked type as opposed to a precondensate and dispersing such an adequately cross-linked condensed resin in an active hydrogen-containing compound having at least two active hydrogen-containing groups reactive with a polyisocyanate compound, such as a polyol. Further, it has been found that such a dispersion can be prepared by a method which comprises firstly conducting a condensation reaction in water and/or an organic solvent to obtain condensed resin particles and then replacing the water and/or the organic solvent as the dispersion medium by an active hydrogen-containing compound such as a polyol, as opposed to a conventional method whereby the condensation reaction is conducted in a polyol.

Thus, the present invention provides a process for producing a condensed resin dispersion, which comprises subjecting an aldehyde and a compound condensable with the aldehyde, or their precondensate, to a condensation reaction in a dispersion medium consisting essentially of water and/or an organic solvent, to precipitate fine condensed resin particles which hardly settle in said dispersion medium, and then replacing the water and/or the organic solvent by an active hydrogen-containing compound having at least two active hydrogen-containing groups reactive with isocyanate groups.

Now, the present invention will be described in detail with reference to the preferred embodiments.

In the present invention, firstly, an aldehyde and a compound condesable with the aldehyde are reacted in a dispersion medium consisting essentially of water and/or an organic solvent to form a condensed resin. In this case, the reaction is adequately conducted so that most of the condensation reaction is thereby completed to obtain a dispersion wherein three dimensionally cross-linked solvent-insoluble condensed resin particles are precipitated and dispersed in the dispersion medium. Then, an active hydrogen-containing compound having at least two active hydrogen-containing groups (hereinafter sometimes referred to simply as the active hydrogen-containing compound) reactive with an organic isocyanate compound is added, and the water and/or the organic solvent is removed under heating and/or under reduced pressure for the substitution of the dispersion medium, to obtain a condensed resin dispersion in said active hydrogen-containing compound as the dispersion medium.

One of the starting materials for the condensed resin of the present invention is an aldehyde. As the aldehyde, aliphatic, alicyclic, aromatic, heterocyclic aldehyde compounds, other aldehydes, condensates thereof or derivatives such as compounds capable of generating aldehydes, may be employed alone or in combination. Preferred aldehydes are lower aliphatic aldehydes. Particularly preferred are aliphatic aldehydes having at most 4 carbon atoms and their derivatives, including, for example, formaldehyde, acetaldehyde, propionaldehyde, butylaldehyde, isobutylaldehyde, paraformaldehyde and paraacetaldehyde. Most preferred is formaldehyde. Such an aldehyde may be used as dissolved in a solvent. A particularly preferred solvent is water. However, the solvent is not limited to water. In the present invention, it is particularly preferred to employ an aqueous solution of formaldehyde i.e. formalin.

Another starting material for the condensed resin is a compound capable of being condensed with the aldehyde to form a solid condensed resin (hereinafter sometimes referred to as an aldehyde-condensable compound). This compound is required basically to have two sites reactive with the aldehyde (hereinafter referred to as reactive sites). A typical reactive site is a carbon atom of an aromatic compound to which hydrogen is bonded, or a nitrogen atom in an amino group or in an amido group to which hydrogen is bonded. As the reactive site in an organic compound, the o- or p-position of the aromatic compound to which a hydroxyl group or an amino group is bonded, is preferred. It is required to have at least two such reactive sites. Namely, a compound having no substitutent at such a site is suitable. As a compound having amino groups or amido groups, a polyamine compound having at least two such groups is basically suitable. Accordingly, as the aldehyde-condensable compound, an aromatic compound such as a phenol or an aromatic amine, urea, a guanidine compound or other polyamine compound is preferred. These compounds capable of reacting with aldehydes, may be used in combination as a mixture of two or more different kinds. Further, a compound having only one reactive site may be used in combination therewith.

Among the aromatic compounds, the phenols include, for example, phenol, cresol, xylenol, p-alkylphenol, p-phenylphenol, bisphenol A and resorcinol. Particularly preferred is phenol. The aromatic amines include, for example, aniline, diaminobenzene, p-alkylaniline, n-substituted alkylaniline, diphenylamine and diaminodiphenylmethane. Like phenol compounds, these aromatic amines may be used alone or in combination as a mixture of two or more different kinds. The amino group or the amido group in an aromatic amine is a reactive site itself. Therefore, such an aromatic amine may be regarded as a kind of the following diamine compounds, and the number of the reactive sites of the aromatic amine other than the amine group or the amido group may be only one. A particularly preferred aromatic amine is aniline. The aromatic compound is not limited to the above-mentioned compounds. For example, an aromatic hydrocarbon such as benzene or xylene, or other compounds may also be employed. Further, a phenol and an aromatic amine may be used in combination. Otherwise, at least one of them is further combined with another aromatic compound.

As the polyamine compound, a compound having basically at least two amino groups or amido groups, especially a compound having at least two amino groups, is preferred. For example, ureas such as urea, thiourea and N-substituted urea, melamine compounds such as melamine and N-alkyl-substituted melamine, S-triadines having at least two amino groups represented by a guanamine compound such as benzoguanamine or acetoguanamine and guanidines such as guanidine, guanidine hydrochloride, aminoguanidine hydrochloride and dicyandiamide. Among them, particualrly preferred are urea, melamine and benzoguanamine. These polyamine compounds may be used in combination as a mixture of two or more. For example, they may be used in a combination of urea-thiourea, urea-melamine, urea-benzoguanamine, urea-melamine-benzoguanamine or melamine-dicyandiamide.

Further, the above-mentioned polyamine compound and the above-mentioned aromatic compound may be used in combination. As such a combination, a combination of phenol-urea, phenol-melamine, aniline-urea, aniline-melamine, phenol-aniline-melamine, phenol-urea-melamine or the like may be mentioned.

In addition to those mentioned above, known ketone compounds useful as starting materials for ketone resins may also be used as the compound condensable with an aldehyde. Further, the above described compound having at least two sites reactive with the aldehyde, may be used in combination with a compound having only one reactive site or with a compound having at least two active reactive sites although it is not an aldehyde-condensable compound itself, such as a dialkanolamine, a monoalkanolamine or an aliphatic amine.

Further, in the present invention, it is possible to employ an aldehyde-condensable compound and a pre-condensate of an aldehyde such as dimethylolurea, hexamethylolmelamine or hexamethoxymethylmelamine, as the starting materials.

There is no particular restriction as to the proportions of the aldehyde-condensable compound and the aldehyde for the reaction to form condensed resin particles, so long as they are within the range of the proportions theoretically capable of forming the condensed resin. An unreacted aldehyde-condensable compound may remain as contained in the formed dispersion, so long as the amount is not excessive. Because, the unreacted aldehyde can be removed at the time of replacing the dispersion medium. The aldehyde is used preferably in an amount of from 5 to 500 parts by weight, particularly from 10 to 100 parts by weight, per 100 parts by weight of the aldehyde-condesable compound.

The condensed resin formed by this reaction is considered to be similar or the same as a cured product of a conventional condensed thermosetting resin such as conventional phenol resin, urea resin or melamine resin, and the reaction for its formation is also believed to be similar. For example, in a case where formaldehyde is used as the aldehyde, the aldehyde-condensable compound and formaldehyde undergoes addition condensation at the initial stage of the reaction, to form various methylol group-containing compounds. The above-mentioned poly condensate as one of the starting materials of the present invention, corresponds to the methylol-addition compound at this stage. Thereafter, the methylol group-containing compound undergoes dehydration condensation, whereby the methylol group is converted to a methylene group, and the condensation takes palces to form a three dimensionally cross-linked solvent-insoluble condensed resin.

As the dispersion medium for this condensation reaction, water and/or an organic solvent is used. This dispersion medium is to be subsequently replaced by an active hydrogen-containing compound and therefore, it is preferably the one removable by a technique such as heating and/or reduced pressure. Preferably, a dispersion medium having a boiling point of not higher than 250° C., particularly not higher than 180° C., is used, or a dispersion medium vaporizable under reduced pressure at a temperature of not higher than 250° C., particularly not higher than 180° C., is used, so that it can be removed under heating, under reduced pressure or more preferably under heating under reduced pressure.

As such a dispersion medium, water and other solvents, for example, an aliphatic hydrocarbon such as pentane, hexane, cyclohexane or hexene, an aromatic hydrocarbon such as benzene, toluene or xylene, an alcohol such as methanol, ethanol, isopropanol, butanol, cyclohexanol or benzyl alcohol, an ether such as isopropyl ether, tetrahydrofuran, benzyl ethyl ether, acetal or anisol, a ketone such as acetone, methyl ethyl ketone or acetophenone, an ester such as ethyl acetate or butyl acetate, a halogenated hydrocarbon such as chlorobenzene, chloroform, dichloroethane or 1,1,2-trichlorotrifluoroethane, a nitro compound such as nitrobenzene, a nitrile such as acetonitrile or benzonitrile, an amine such as trimethylamine, triethylamine, tributylamine or dimethylaniline, an amide such as N,N-dimethylformamide or N-methylpyrrolidone, and a sulfur compound such as dimethylsulfoxide or sulforane, may be mentioned. In the present invention, these dispersion media may be used alone or in combination as a mixture. The active hydrogen-containing compound which will be described hereinafter, is usually a compound having a very high boiling point or substantially no biling point (when heated, it decomposes without being vaporized). Even when it has a boiling point, the boiling point usually exceeds 250° C. Even when the active hydrogen-containing compound has a boiling point of not higher than 250° C., it is preferably the one having a boiling point higher by at least 20° C., preferably at least 50° C., than the boiling point of the dispersion medium used. In other words, when an active hydrogen-containing compound having such a relatively low boiling point is employed, it is preferred to employ a dispersion medium having a boiling point lower by at least 20° C., preferably at least 50° C., than its boiling point.

The aldehyde-condensable compound and the aldehyde, or their precondensate, may be reacted in an organic solvent. However, in the precondensate state, the compatibility with water is high, and it is preferred to use water and an organic solvent in combination. When the aldehyde-condensable compound and the aldehyde, or their precondensate, has affinity to an organic solvent, the initial condensation reaction proceeds uniformly, and thereafter, condensed resin particles will precipitate. When the starting material has no affinity to the organic solvent, the reaction proceeds in an emulsified state from the initial condensation reaction stage, and condensed resin particles will precipitate in that state.

Basically, the present invention is a process which is characterized in that the reaction for the formation of the condensed resin is completed prior to the replacement of the dispersion medium by the active hydrogen-containing compound. Whether the cross-linking is sufficient or not can be determined, as the hydroxyl value decreases as the methylol groups formed in the initial stage of the reaction are converted to methylene groups. Namely, in a case where the dispersion medium is substituted by a polyol as the active hydrogen-containing compound, when the hydroxyl values of the polyol and the obtained dispersion are compared, an increase in the hydroxyl value of the dispersion indicates the presence of methlol groups due to insufficient cross-linking, and a decrease or a equal level of the hydroxyl value indicates sufficient cross-linking.

The particle size of the condensed resin particles sufficiently cross-linked according to the present invention is preferably within a range of from 0.01 to 5 $\mu$m, more preferably within a range from 0.1 to 2 $\mu$m. If the particle size exceeds 5 $\mu$m, the particles are likely to settle in the active hydrogen-containing compound such as a polyol. The particles may be those which are likely to settle in the dispersion medium easily or in a relatively short period of time. However, preferably, they do not easily settle in the dispersion medium. Namely, it is preferred that the precipitated condensed resin particles do not substantially settle in the dispersion medium before conducting the subsequent replacement of the dispersion medium. It is particularly preferred that the particles do not settle for more than one day when left to stand. Further, after the replacement of the dispersion medium, it is preferred that the condensed resin particles do not substantially settle for at eleast one month, preferably at least two months, when left to stand.

Now, the process for obtaining this condensed resin compound will be described in further detail.

The aldehyde-condensable compound and the aldehyde are reacted at a temperature of from room temperature to an elevated temperature and/or under pressure. It is considered that at a relatively low temperature, an aldehyde-added methlol group-containing compound or a low molecular weight condensate is likely to form, and at a relatively high temperature, methylene cross-linking or dimethylene ether linkage is likely to form due to a dehydration reaction of e.g. methlol groups. Of course, the compound to be formed is not solely dependent on the reaction temperature and varies depending also on the charging ratio of the constituting units, the presence of an additive such as a catalyst or the pH. However, taking only the reaction temperature into consideration, it is preferred to conduct the reaction at a relatively low temperature during the initial stage of the reaction and at a relatively high temperature during the later stage of the reaction. Especially, a relatively high temperature during the later stage of the reaction is necessary, in many cases, for the condensation reaction of hydroxyalkyl groups such as methylol groups to take place. Thus, it is preferred to conduct the reaction at a reaction temperature of not higher than about 80° C. during the initial stage of the reaction and at a temperature higher by 10° C. than the temperature at the initial stage and at least above 60° C. during the later stage. The upper limit of the temperature during the later stage of the reaction is preferably a temperature at which the decomposition of the active hydrogen-containing compound or the side reaction other than the reaction for forming the condensed resin hardly takes place. When water is used as the solvent, the reaction during the later stage is conducted preferably at a temperature of from 80° to 150° C., more preferably from 80° to 100° C. under atmospheric pressure. In the case of an organic solvent or a combination of water and an organic solvent, it is conducted preferably at a temperature of from 80° to 200° C.

In order to let the condensation reaction proceed at a relatively low temperature, it is possible to employ an acid such as hydrochloric acid or acetic acid, or a base such as sodium hydroxide or triethylamine, as a catalyst. Further, to improve the stability of the condensed resin particles, it is effective to add a surfactant in an amount of from 0.01 to 20% by weight, preferably from 0.1 to 10% by weight, relative to the condensed resin, or to add during the condensation reaction, a part of the active hydrogen-containing compound such as a polyol or an aminopolyether to be subsequently used for replacing the dispersion medium, in an amount of not higher than 100 parts by weight, preferably not higher than 50 parts by weight, per 100 parts by weight of the condensed resin. Further, the reaction can be conducted in the presence of various additives including a curing agent such as hexamethylenetetramine, a dispersion stabilizer and a coloring agent. Particularly preferred additives are a surfactant and a particle dispersion stabilizer selected from specific active hydrogen-containing compound which will be described hereinafter.

It is undesirable that the active hydrogen-containing compound used as a material for polyurethane contains a realtively large amount of water. Therefore, it is necessary to remove water initially used as a solvent or a dispersion medium, at the time of the replacement with a polyol. Usually, water is removed under heating or under reduced pressure. Further, an organic solvent used as a solvent or as a dispersion medium can also be removed under heating at a temperature of not higher than 250° C. and/or under reduced pressure. Accordingly, by additing an active hydrogen-containing compound to the dispersion of precipitated condensed resin particles in water and/or an organic solvent as a dispersing medium, and removing the water and/or the organic solvent under heating and/or under reduced pressure, the dispersion medium can be replaced by the active hydrogen-containing compound. In a material for a polyurethane foam, the presence of a small amount of water is permissible, since it serves as a foaming agent.

It is a feature of the present invention that most of the condensation reaction is completed prior to the replacement of the dispersion medium. However, it is possible that during the removable of water, condensation of an unreacted material takes palce, followed dehyration.

As a surfactant serving as a particle dispersion stabilizer, it is effective to employ any one of anionic, cationic, amphoteric and non-inonic surfactants. The anionic surfactants include, for example, a fatty acid salt, a higher alcohol sulfuric acid ester, an alkylbenzene sulfonate, an alkyl naphthalene sulfonate, a naphthalene sulfonic acid-formarin condensation product, a dialkyl sulfone succinate, an alkyl phosphate, a polyoxyethylenesulfate and an anion composed of a special polymer active agent. Paticularly preferred are, for example, a fatty acid salt such as potassium oleate and a higher alcohol sulfuric acid ester salt such as sodium lauryl sulfate. The cationic surfactants include, for example, an alkylamine salt, a quaternary ammonium salt and a polyoxyethylene alkylamine. Particularly preferred is a quaternary ammonium salt such as lauryl trimethyl ammonium chloride or cethyltrimethyl ammonium chloride. The amphoteric surfactants include alkylbetaines such as laurylbetaine and stearylbetaine. The non-ionic surfactants include, for example, a polyoxyethylenealkyl ether, a polyoxyethylene alkylphenol ether, a sorbitane fatty acid ester, a polyoxyethylene sorbitane fatty acid ester, a polyoxyethylene acryl ester, an oxyethylene-oxypropylene block polymer and a fatty acid monoglyceride. Particularly preferred are polyoxyethylene alkyl ethers such as poyoxyethylene lauryl ether.

The active hydrogen-containing compound of the present invention has at least two, preferably from 2 to 8, active hydrogen-containing groups per molecule. The active hydrogen-containing groups are preferably hydroxyl groups, primary amino groups and/or secondary amino groups. An active hydrogen-containing compound having a molecular weight of from 100 to 10,000, preferably from 200 to 8,000, more preferably from 400 to 6,000, per active hydrogen-containing group is preferred. For example, a polyether polyol, a polyester polyol, a hydrocarbon polymer having terminal hydroxyl groups or a so-called polymer polol may be mentioned. Particularly preferred is a polyether polyol as a compound having amino groups, a polyether polyol, an aminated polyol having a part or whole of hydroxy groups of a polyester polyol substitued by a primary or secondary amino groups, or a mixture thereof, may be mentioned.

The polyether polyol includes, for example, a polyhydroxy compound such as a polyhydric alcohol, a polyether polyol having an alkyleneoxide added to an active hydrogen-containing compound such as an amine or phosphoric acid, and a polyether polyol composed of a cyclic ether polymer.

Specifically, it includes a polyhydric alcohol such as glycol, glycerol, trimethylolpropane, pentaerythritol, sorbitol, dextrose or sucrose, an alkanolamine such as diethanolamine or triethanolamine, a polyvalent phenol such as bisphenol A or a phenol-formaldehyde condensation product, a polyether polyol having an alkyleneoxide such as ethyleneoxide, propyleneoxide, butyleneoxide or epichlorohydrin, or an epoxide such as ethyleneoxide or glycidyl ether, added to an amine such as ethylenediamine or diaminodiphenyl methane, and a polyether polyol which is tetrahydrofuran polymer. These polyether polyols may be used in combination as a mixture of two or more different kinds. The polyether polyol is preferably the one having a molecular weight of from 300 to 1,000 per hydroxyl group, more preferably the one having a molecular weight of from 600 to 6,000 per hydroxyl group and having from 2 to 8 hydroxyl groups.

As the aminated polyol, there may be employed one obtained by aminating a polyether polyol with ammonia, or one obtained by hydrolyzing an isocyanate group-containing prepolymer obtained by the reaction of the polyether polyol with a polyisocyanate. Particularly preferred is the former.

A polyhydric alcohol similar to the above-mentioned active hydrogen-containing compound but having a lower molecular weight, an ester having a hydroxyl group such as a polyhydroxylester, etc. may be employed. As such a polyhydric alcohol, a liquid alcohol among those useful as initiators for the above polyether, polyester or polyether polyol, may be employed.

Among the active hydrogen-containing compounds, a compound useful as a particle dispersion stabilizer which is effective for the stability of the dispersion when preliminarily added to the water and/or the organic solvent, is a compound having functional groups reactive particularly with the aldehyde or a high molecular weight active hydrogen-containing compound. Here, the high molecular weight compound is an active hydrogen-containing compound having a molecular weight of at least 2,000, particularly at least 3,000, per hydroxyl group. In the case of a polyether polyol, the hydroxyl value is preferably at most 28. The compound having a functional group reactive with the aldehyde is preferably an active hydrogen-containing compound having an urethane bond, a urea bond or other bond formed-by the reaction of a hydroxyl group or an amino group with an isocyanate group. As a specific example, a prepolymer having an urethane bond or a urea bond obtained by reacting the above-mentioned polyether polyol or aminated polyol with less than the equivalent of a polyisocyanate compound may be mentioned. This prepolymer is preferably a high molecular weight compound as mentioned above. Further, it is also possible to use a prepolymer obtained by reacting less than the equivalent of a polyisocyanate compound to a mixture of the polyether polyol or aminated polyol with a low molecular weight polyamine, alkanolamine or polyhydric alcohol. It is also possible to employ a polyether polyol having fine particles of polyurea dispersed therein, which is obtained by reacting a mixture of a polyether polyol and a low molecular weight polyamine, with substantially the equal equivalent, relative to the polyamine, of a polyisocyanate compound. A polyether polyol having fine particles of a condensed resin such as polyurea, polyurethane or polyurethaneurea dispersed therein, is known as a kind of the above-mentioned polymer polyols. Further, a polyisocyanate compound may be added to a dispersion medium containing water and an active hydrogen-containing compound for reaction, and a condesed aldehyde resin may be formed therein. In this case, the polyisocyanate compound is believed to react with water and with the active hydrogen-containing compound to form polyurea, polyurethaneurea or polyurethane. Therefore, the polyisocyanate compound itself is effective as a particle dispersion stabilizer.

The particle dispersion stabilizer is used usually in an amount of not more than 100 parts by weight, particularly not more than 50 parts by weight, per 100 parts by weight of the total amount of the water and the organic solvent. The surfactant is preferably from 0.1 to 20 parts by weight. When the particle dispersion stabilizer is similar to the active hydrogen-containing compound to be finally substituted for the dispersion medium, particularly, when it is a polyol, it may be used in a larger amount. As described above, by forming a condensed aldehyde resin in the dispersion medium containing a particle dispersion stabilizer, the dispersion stability of the condensed aldehyde resin particles in the dispersion obtained by replacing the dispersion medium by the active hydrogen-containing compound, is improved. The ative hydrogen-containing compound to be substituted for the dispersion medium may not necessarily be the same as the active hydrogen-containing compound preliminarily added to the dispersion medium. For example, it is possible to employ a polyether polyol having a molecular weight of at most 1,500 per hydroxyl group, which is widely used as a starting material for a polyurethane foam.

There is no particular restriction as the ratio of the dispersed condensed resin to the active hydrogen-containing compound in the dispersion of the present invention, so long as the condensed resin is dispersed in a stabilized state. However, if the ratio is excessive, the dispersion stability tends to deteriorate and the viscosity tends to be high. In a usual case, the condensed resin is preferably at most 200 parts by weight, more preferably at most 100 parts by weight, per 100 parts by weight of the active hydrogen-containing compound. There is no particular lower limit. However, the condensed resin is preferably present in an amount of at least 5 parts by weight, per 100 parts by weight of the active hydrogen-containing compound in order to provide the effects of the dispersion of the present invention for the production of polyurethane.

The solid condensed resin dispersion of the present invention obtained as described above, is preferably a white or colored translucent or opaque viscous liquid having the condensed resin particles having a particle size of from 0.1 to 5 $\mu$m dispersed therein, and the viscosity varies depending upon the viscosity of the active carbon-containing compound used, the proportion of the condensed resin in the dispersion, the type of the condensed resin, etc. However, as a starting material for polyurethane, the dispersion preferably has a viscosity of not higher than 50,000 cps at 25° C. Even when the viscosity is higher than this, it is of course possible to use such a dispersion by e.g. diluting it with other active hydrogen-containing compound.

In the dispersion of the present invention, most of the condensed resin is believed to be dispersed in the active hydrogen-containing compound. In the process of the present invention, the condensation reaction is substantially completed during the reaction in the water and/or the organic solvent, and a condensation reaction no longer proceeds in the active hydrogen-containing compound after the replacement of the dispersion medium, and no grafting of the condensed resin to the active hydrogen-containing compound is believed to take place. However, when a part of an active hydrogen-compound is added and reacted for condensation to improve the dispersibility in the water and/or the organic solvent, it is possible that the grafting takes place.

In the present invention, in the case of a dispersion wherein an active hydrogen-containing compound containing an aromatic nucleus or an amino group or an amido group is employed, such a active hydrogen-containing compound has good affinity with the condensed resin, whereby a particularly exellent dispersed state will be obtained.

The condensed resin dispersion of the present invention is preferably such that it undergoes no separation when left to stand for at least about one month, preferably at least two months. However, there is no particular restriction as to such period of time. The reason for such excellent dispersion stability of the product of the present invention, is considered to be such that the particle size of the condensed resin particles is fine and uniform.

The hydroxyl value of the condensed resin dispersion of the present invention is primarily related to the hydroxyl groups in the active hydrogen-containing compound. The hydroxyl value of the active hydrogen-containing compound is preferably at most 800 in the present invention. Particularly in the case of a polyol having a high molecular weight of from 300 to 10,000 per hydroxyl group, the hydroxyl value is from about 5 to 190.

As described above, the condensed resin in the dispersion of the present invention, is of a sufficiently cross-linked type and accordingly does not substantially have functional groups containing hydroxyl groups such as methylol groups. Accordingly, the hydroxyl value of the dispersion will not substantially be high as compared with the hydroxyl value of the active hydrogen-containing compound used as the dispersion medium and will be lower than the hydroxyl value of the active carbon-containing compound in proportion to the content of the condensed resin. Therefore, the hydroxyl groups in the dispersion are preferably not higher than 1.2 times, more preferably equal or lower, than the hydroxyl groups of the active hydrogen-containing compound. However, for example in a case where a hydroxyl group-containing organic compound such as a phenol compound is used, the hydroxyl value of the dispersion may sometimes be higher than the hydroxyl value of the active hydrogen-containing compound. In the case of a conventional amino resin polycondensate-containing polyol, if the hydroxyl value of the polyol used is higher than the hydroxyl value of the amino resin precondensate, the hydroxyl value of the dispersion polyol will be lower than the hydroxy value of the original polyol. However, if the one having a hydroxyl value as high as at least about 600 such as dimethylol urea or polymethylol melamine is used as a constituting component of the amino resin precondensate and this is combined with a polyol having a low hydroxyl value (i.e. of a high molecular weight) to form a dispersion, the hydroxyl value of the dispersion will be substantially higher than the hydroxyl value of the polyol.

The condensed resin disperion of the present invention obtained by the process described in the foregoing, is particularly suitable for use as a part or whole of the active hydrogen-containing compound as the main material for the production of polyurethane. Further, the condensed resin disperion of the present invention containing an active hydrogen-containing compound having a relatively low molecular weight, can be used also as a part or whole of the cross-linking agent as a subsidiary material for polyurethane. The conventional polymer polyol tends to lower the flame retardancy of polyurethane. Whereas, the condensed resin of the present invention improves the flame retardancy of polyurethane. Particularly, the condensed resin dispersion of the present invention wherein a phenol compound, a urea compound, a melamine compound, a guanamine compound or a guanidine compound is used as the main component, is particularly effective for the improvement of the flame retardancy of polyurethane.

Accordingly, the present invention is concerned also with an application of the condensed resin dispersion and provides a process for producing polyurethane wherein an active hydrogen-containing compound containing at least two active hydrogen atoms reactive with an organic isocyanate compound and a polyisocyanate compound are used as starting materials, which process is characterized in that the condensed resin dispersion of the present invention is used as a part or whole of the active hydrogen-containing compound. As a polyol useful as the basic material for polyurethane, a high molecular weight polyol having a molecular weight of from 300 to 3,000 per hydroxyl group, particularly a polyether polyol having a molecular weight of from 600 to 2,500 per hydroxyl group and having from 2 to 8 hydroxyl groups per molecule, is usually employed. As a starting material for a hard polyurethane foam, a polyol having a lower molecular weight than the above is employed. Accordingly, when the condensed resin dispersion of the present invention is used as a part of the starting material for polyurethane, the above-mentioned conventional high molecular weight polyol may suitably be used as the other polyol to be used in combination. However, the polymer to be used in combination is not restricted to such a polyol, and a polyol having a still higher molecular weight may be employed.

For the preparation of polyurethane, it is possible to employ, in addition to the basic materials of the polyol and the polyisocyanate, a cross-linking agent composed of an active hydrogen-containing compound having a relatively low molecular weight, which contains at least two active hydrogen atoms, such as a polyhydric alcohol, an alkanol amine or a polyamine. The above-mentioned condensed resin dispersion, particularly the condensed resin dispersion obtainable by using a low molecular weight polyol, may be used as a part or whole of this curing agent. As the polyurethane in the present invention, a polyurethane foam is most suitable. The condensed resin dispersion of the present invention can be used in the same manner as the conventional polymer polyol to obtain a polyurethane foam having excellent properties. For the production of a polyurethane foam, it is usually necessary to use a foaming agent. As the foaming agent, water or a halogenated hydrocarbon such as trichlorofluoromethane, dichlorodifluoromethane, dichlorotrifluoroethane, dichloromonofluoroethane, methylene chloride or the like, may be used. Further, a foam stabilizer is required in many cases for the production of a polyurethane foam. As the foam stabilizer, an organic silicon compound such as a poly(dialkylsilane) or a polyoxyalkylene chain-containing silane is useful. In some cases, a fluorine surfactant may also be used. A catalyst is usually used for the production of a foamed or non-foamed polyurethane. As such a catalyst, various tertiary amines, other amine compounds or organic tin compounds may be used alone or in combination. Various additives such as a stabilizer, a filler, a reinforcing agent, a coloring agent, a releasing agent, a cross-linking agent, an chain extender and a flame retardant, may be used as other starting materials for foamed or non-foamed polyurethanes.

The other basic material for polyrethane is a polyisocyanate compound. As the polyisocyanate compound, aromatic, aliphatic, alicyclic and heterocyclic compounds having at least two isocyanate groups may be used alone or in combination. It is particularly preferred to employ an aromatic polyisocyanate compound. Specific examples of such polyisocyanate compounds include tolylene diisocyanate (TDI), diphenylmethane isocyanate (MDI), polymethylene polyphenyl isocyanate, xylylene diisocyanate, naphthalene diisocyanate, hexamethylene diisocyanate and isophorone diisocyanate. The polyisocyanate compound may be used in the form of a modified polyisocyanate compound obtained by modifying the compound by various methods or with various compounds. Further, it is possible to use block isocyanate compounds blocked with various compounds. There is no particular restriction as to the method for producing polyurethane by using these staring materials. For example, a one shot method, a prepolymer method or a RIM may be employed.

The functional mechanism to provide a condensed resin dispersion having excellent dispersion stability and low viscosity according to the present invention, is not clearly understood but is considered to be such that the condensed resin particles are fine and uniform and do not substantially react with the polyol, and most of the particles are present independently.

Now, the present invention will be described in further detail with reference to Examples. However, it should be understood that the present invention is by no means restricted by such specific Examples. In these Examples, "parts" means "parts by weight".

EXAMPLE 1

50 parts of melamine and 70 parts of a 35% formaldehyde aqueous solution [24.5 parts of formaldehyde and 45.5 parts (37.9 parts by weight of the total system) of water (excluding formed water)] were charged into a reactor, and 2 parts of 0.5N HCl was added. Then, the mixture was heated to 60° C., and continuously stirred for one hour and then further reacted at 100° C. for two hours. The system became turbid in white during the reaction. A stable aqueous suspension having fine particles dispersed therein was obtained. To this suspension, 150 parts of polyoxyethylene propylene triol having a molecular weight of 5,000 was added, and water in the system was removed under reduced pressure at 100° C. to obtain a white viscous emulsion. The hydroxyl value was 25.0, and the viscosity was 2,100 cp (25° C.). Solid paticles in this polyol were found to be dispersed in a stabilized state without separation from the polyol for more than two months.

Comparative Example 1

With a system wherein the polyoxyethylene propylene triol was charged simultaneously with the melamine and the formaldehyde aqueous solution in the same composition as in Example 1, followed by the reaction, a similar white dispersion was obtained. However, the viscosity of the dispersion was as high as 3,500 cp (25° C.).

EXAMPLE 2

50 Parts of urea, 30 parts of dicyandiamide, 150 parts of a 35% formaldehyde aqueous solution [52.5 parts of formaldehyde and 97.5 parts (37.5% by weight of the total system) of water (excluding formed water)] and 30 parts of polyoxyethylene propylene triol having a molecular weight of 3,000 were charged into a reactor and reacted at 80° C. for 5 hours and at 100° C. for further 3 hours. The system became turbid in white during the reaction. An aqueous suspension having fine particles dispersed therein was obtained. To this dispersion, 90 parts of polyoxyethylene propylene triol having a molecular weight of 3,000 was added, and water in the system was removed under reduced pressure at 100° C. to obtain a white viscous emulsion. The hydroxyl value of this emulsion was 30.8, and the viscosity was 4,800 cp (25° C.). Solid particles in this polyol were found to be dispersed in a stabilized state without separation from the polyol for more than two months.

EXAMPLE 3

50 Parts of dimethylol urea, 100 parts of water and 2 parts of 0.5N HCl were charged into a reactor and reacted at 100° C. for three hours. The system became turbid in white during the reaction. An aqueous suspension having fine particles dispersed therein was obtained. To this suspension, 100 parts of polyoxyethylene propylene hexanol using a sorbitol initiator having a molecular weight of 6,000, was added, and water in the system was removed under reduced pressure at 100° C. to obtain a white viscous emulsion. The hydroxyl value of this emulsion was 38.3, and the viscosity was 3,200 cp (25° C.). Solid particles in this polyol were found to be dispersed in a stabilized state without separation from the polyol for more than two months.

EXAMPLE 4

30 Parts of urea, 20 parts of melamine, 50 parts of a 35% formaldehyde aqueous solution and 80 parts of toluene were charged into a reactor, and then 2 parts of 0.5N HCl was added thereto. Then, the mixture was reacted at 60° C. for one hour and at 100° C. for further two hours. The system became turbid in white during the reaction. A dispersion of fine particles was obtained. To this dispersion, 150 parts of polyoxyethylene propylene triol having a molecular weight of 3,000 was added, and water and toluene in the system were removed under reduced pressure at 100° C. to obtain a white viscous emulsion. The hydroxyl value of this emulsion was 41.5, and the viscosity was 1,980 cp (25° C.). Solid particles in this polyol were found to be dispersed in a stabilized state without separation from the polyol for more than two months.

Comparative Example 2

With a system wherein the polyoxyethylene propylene triol was charged simultaneously with the urea, the melamine and the formaldehyde aqueous solution in the same composition as in Example 4, followed by the reaction, a white emulsion similar to the one obtained in Example 4, was obtained, but the viscosity was as high as 2,800 cp (25° C.).

EXAMPLE 5

50 Parts of melamine, 30 parts of dicyanamide, 150 parts of a 35% formaldehyde aqueous solution, 30 parts of polyoxyethylene propylene triol having a molecular weight of 5,000 and 300 parts of N,N'-dimethylformamide were charged into a reactor and reacted at 80° C. for 5 hours and at 100° C. for further three hours. The system became turbid in white during the reaction. A dispersion of fine particles was obtained. To this dispersion, 90 parts of polyoxyethylene propylene triol having a molecular weight of 5,000 was added, and water and N,N-dimethylformamide in the system were removed under reduced pressure at 100° C. to obtain a white viscous emulsion. The hydroxyl value of this emulsion was 20.0, and the viscosity was 5,100 cp (25° C.). Solid particles in this polyol were found to be dispersed in a stabilized state without separation from the polyol for more than two months.

EXAMPLE 6

50 Parts of hexamethoxymethylmelamine, 20 parts of water, 50 parts of methyl isobutyl ketone and 2 parts of 0.5N HCl were charged into a reactor and reacted at 100° C. for three hours. The system became turbid in white during the reaction. A disperion of fine particles was obtained. To this dispersion, 100 parts of polyoxyethylene propylene triol using a sorbitol initiator having a molecular weight of 6,000, was added, and water and methyl isobutyl ketone in the system was removed under reduced pressure to obtain a white viscous emulsion. The hydroxyl value of this emulsion was 39.5, and the viscosity was 3,100 cp (25° C.). Solid particles in this polyol were found to be dispersed in a stabilized state without separation from the polyol for more than two months.

EXAMPLE 7

50 Parts of melamine, 70 parts of a 35% formaldehyde aqueous solution, 2 parts of sodium lauryl sulfate and 2 parts of 0.5N HCl were charged into a reactor and reacted at 60° C. for one hour and at 100° C. for further two hours. The system became turbid in white during the reaction. A bluish white aqueous suspension having fine particles dispersed therein was obtained to this suspension, 150 parts of polyoxyethylene propylene triol having a molecular weight of 5,000 was added, and water in the system was removed under reduced pressure at 100° C. to obtain a bluish white viscous emulsion of the present invention. The hydroxyl value of this emulsion was 24.5, and the viscosity was 2,250° C. (25° C.). Solid particles in this polyol were found to be dispersed in a stabilized state without separation from the polyol for more than 6 months.

EXAMPLE 8

With a system wherein the polyoxyethylene propylene triol was charged simultaneously with the melamine formaldehyde aqueous solution in the same composition as in Example 7, a similar white dispersion was obtained. This dispersion had a viscosity of 3,650 cp and was stable for at least three months.

EXAMPLE 9

50 Parts of urea, 30 parts of dicyanediamide, 150 parts of a 35% formaldehyde aqueous solution, 5 parts of polyoxyethylene lauryl ether (Kao-ATLAS Emulgen 147) and 30 parts by of polyoxyethylene propylene triol having a molecular weight of 3,000 were charged into a reactor and reacted at 80° C. for 5 hours and at 100° C. for further three hours. The system became turbid during the reaction. A bluish white aqueous suspension having a fine particles dispersed therein was obtained. To this suspension, 90 parts of polyoxyethylenepropylene triol having a molecular weight of 3,000 was added, and water in the system was removed under reduced pressure at 100° C. to obtain a bluish white viscous emulsion. The hydroxyl value of this emulsion was 31.5, and the viscosity was 4,400 cp. Solid particles in this polyol were found to be dispersed in a stabilized state without separation from the polyol for more than 6 months.

EXAMPLE 10

50 Parts of hexamethoxymethylmelamine, 20 parts of water, 50 parts of methyl isobutyl ketone, 1 part of lauryl trimethylammonium chloride (KAO-ATLAS Cotamine 24 p) and 2 parts of 1N HCl were charged into a reactor and reacted at 100° C. for three hours. The system became turbid during the reaction. A bluish white aquous suspension having fine particles dispersed therein was obtained. To this suspension, 100 parts of polyoxyethylene propylene hexanol using a sorbitol initiator having a molecular weight of 6,000, was added, and water and methyl isobutyl ketone in the system was removed under reduced pressure to obtain a bluish white viscous emulsion was obtained. The hydroxyl value of this dispersion was 39.9, and the viscosity was 3,300 cp. Solid particles in this polyol were found to be dispersed in a stabilized state without separation from the polyol for more than 6 month.

Comparative Example 11

Preparation of a high molecular weight polyol

A urea group-containing polyol having a theoretical molecular weight of about 14,400 (hydroxyl value: 11.7) was prepared by reacting 34.8 parts by weight of tolylene diisocyanate to 1,400 parts by weight of polyoxypropyleneoxyethylene triol having a molecular weight of 7,000 and an ethylene oxide content of 20%, by using 6 parts by weight of ethylenediamine as a chain extender and using glycerol has a initiator.

Preparation of a polyol dispersion

Into a 5 liter pressure reactor, 150 parts by weight of the above urea group-containing polyol, 600 parts by weight of urea, 300 parts by weight of benzoguanamine and 1,500 parts by weight of a 35% formalin aqueous solution were charged and reacted at 80° C. for two hours and at 100° C. for further two hours to obtain a bluish white viscous emulsion having particles precipitated therein. To this emulsion, 1,950 parts by weight of polyoxypropylene ethylene triol having a molecular weight of 5,000 and an ethylene oxide content of 15% was added under initiation with glycerol, and water was removed under reduced pressure at 140° C. to obtain a bluish white turbid polyol dispersion.

EXAMPLE 12

Into a 5 liter pressure reactor, 1,500 parts by weight of polyoxypropylene oxyethylene triol having a molecular weight of 8,000 (hydroxyl value: 21) and an ethylene oxide content of 10%, 1,000 parts by weight of trimethylolmelamine, 500 parts by weight of dicyanediamide, 500 parts by weight of water and 500 parts by weight of ethanol were charged. The mixture was reacted at 80° C. for 4 hours under stirring and then gradually heated to 140° C. to remove water and ethanol under reduced pressure, to obtain a bluish white paste-like polyol dispersion. This dispersion was diluted to a ½ concentration with polyoxypropylene oxyethylene triol having a molecular weight of 5,000 and an ethylene oxide content of 15%, to obtain a polyol dispersion having low viscosity and excellent particle dispersion stability in the presence of glycerol as an initiator.

EXAMPLE 13

Preparation of a polyol having fine particles of polyurea resin dispersed therein 900 parts of polyoxypropylene oxyethylene triol having a molecular weight of 5,000 and 25 parts of ethylenediamine were charged into a reactor containing glycerol as an initiator, and 75 parts of tolylenediisocyanate was gradually dropwise added at room temperature under vigorous stirring. Mild heat generation took place simulatenously with the dropwise addition, and the mixture became turbid in white. After the dropwise addition, the mixture was heated to 80° C. and stirring was continued for two hours to obtain a white viscous polyol composition having fine particles of polyurea dispersed uniformly therein.

Preparation of a dispersion 400 parts of urea, 100 parts of dicyanediamide, 80 parts of the above polyurea-dispersed polyol and 1,000 parts of a 35% formalin aqueous solution were reacted at 60° C. for two hours and at 90° C. for further three hours to obtain a white viscous emulsion.

To this viscous emulsion, 1,500 parts of polyoxypropylene oxyethylene polyol having a molecular weight of 15,000 as initiated with sorbitol was added, and the mixture was slowly stirred, and water was removed under reduced pressure to obtain a bluish white polyol composition having no water remained therein. The hydoxyl value thereof was 17.3, and the viscosity was 6,300 cp. Solid particles in this polyol were found to be dispersed in a stabilized state without separation from the polyol for more than 6 months.

EXAMPLE 16

300 parts of urea, 200 parts of dicyandiamide, 80 parts of a polyoxypropylene oxyethylene polyol having a molecular weight of 10,000 with sorbitol as initiator, 950 parts of a 35% formalin and 4 parts of hexamethylene diisocyanate were reacted at 60° C. for two hours and at 90° C. for further three hours, to obtain a white viscous emulsion. To this viscous emulsion, 1,500 parts of the above polyoxypropylene oxyethylene polyol was added and thoroughly mixed. Then, water was removed under reduced pressure to obtain a bluish white polyol composition having no water remaining therein. The hydroxyl value of this product was 24.7, and the viscosity was 4,800 cp. Solid particles in this polyol were found to be dispersed in a stabilized state without separation from the polyol for more than 6 months.

EXAMPLE 17

40 parts of melamine, 20 parts of dicyandiamide, 95 parts of 35% aqueous solution of formaldehyde, 25 parts of water and 10 parts of a polyoxypropylene oxyethylene triol having a molecular weight of 15,000 (hydroxyl value=11.2 and ethylene oxide content=15%) were reacted at 60° C. for one hour with stirring, and at 100° C. for further two hours to obtain a bluish white viscous dispersion composition of small particles. To this dispersion composition, 130 parts of polyoxypropylene oxyethylene polyol (ethylene oxide content=15%) was added, and the mixture was dehydrated at 130° C. under reduced pressure to obtain a bluish white viscous polyol composition. The hydroxyl value of this product was 22.4, and the viscosity was 2,750 cp (at 25° C.). Solid particles in this polyol were found to be dispersed in a stabilized state without separation from the polyol for more than 2 months.

We claim:

1. A process for producing a condensed resin dispersion, which comprises subjecting an aldehyde and a compound having two sites reactive with the aldehyde, or their precondensate, to a condensation reaction in a dispersion medium consisting essentially of water and/or an organic solvent, to precipitate a condensed aldehyde resin as fine condensed resin particles with a particle size of from 0.01 to 5 μm in said dispersion medium, then adding an active hydrogen-containing compound having at least two active hydrogen-containing groups reactive with isocyanate groups, and then removing the water and/or organic solvent by vaporization.

2. The process according to claim 1, wherein the removal of the water and/or the organic solvent is conducted by vaporization under heating and/or under reduced pressure.

3. The process according to claim 1, wherein the active hydrogen-containing compound has a boiling point or decomposition point higher than the boiling point of the water and/or the organic solvent used.

4. The process according to claim 1, wherein the active hydrogen-containing compound has from 2 to 8 hydroxyl groups and/or amino groups and has a molecular weight of from 100 to 10,000 per active hydrogen-containing group.

5. The process according to claim 4, wherein the active hydrogen-containing compound is a polyether polyol having from 2 to 8 hydroxyl groups and polyoxyalkylene chains and having a molecular weight of from 600 to 10,000 per hydroxyl group.

6. The process according to claim 1, wherein the dispersion medium consisting essentially of water and/or an organic solvent, contains a particle dispersion stabilizer.

7. The process according to claim 6, wherein the particle dispersion stabilizer is a surfactant.

8. The process according to claim 6, wherein the particle dispersion stabilizer is a polyisocyanate compound.

9. The process according to claim 6, wherein the particle dispersion stabilizer is a active hydrogen-containing compound.

10. The process according to claim 9, wherein the active hydrogen-containing compound has a bond formed by the reaction of an active hydrogen-containing group with an isocyanate group.

11. The process according to claim 10, wherein the bond formed by the reaction with the isocyanate group is a urethane bond or a urea bond.

12. The process according to claim 9, wherein the active hydrogen-containing compound is an active hydrogen-containing compound containing fine particles of polyurea, polyurethane or polyurethaneurea formed by the reaction of an active hydrogen-containing group with an isocyanate group.

13. The process according to claim 9, wherein the active hydrogen-containing compound is a polyether polyol having a hydroxyl value of not higher than 28.

* * * * *